(12) United States Patent
Sunako

(10) Patent No.: US 11,336,787 B2
(45) Date of Patent: May 17, 2022

(54) IMAGE SCANNING DEVICE

(71) Applicant: BROTHER KOGYO KABUSHIKI KAISHA, Nagoya (JP)

(72) Inventor: Shuichi Sunako, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/183,519

(22) Filed: Feb. 24, 2021

(65) Prior Publication Data

US 2021/0306496 A1    Sep. 30, 2021

(30) Foreign Application Priority Data

Mar. 27, 2020  (JP) .............................. JP2020-057873

(51) Int. Cl.
*H04N 1/04* (2006.01)
*H04N 1/00* (2006.01)
*H04N 1/40* (2006.01)

(52) U.S. Cl.
CPC ..... *H04N 1/00718* (2013.01); *H04N 1/00737* (2013.01); *H04N 1/00835* (2013.01); *H04N 1/40056* (2013.01)

(58) Field of Classification Search
CPC ........... H04N 1/00718; H04N 1/00737; H04N 1/00835; H04N 1/40056

USPC ................. 358/474, 486, 475; 399/211, 212
See application file for complete search history.

(56) References Cited

U.S. PATENT DOCUMENTS

2009/0296172 A1\* 12/2009 Iwatsuka .................. H04N 1/40
358/509

FOREIGN PATENT DOCUMENTS

JP          2012-191580 A      10/2012

\* cited by examiner

*Primary Examiner* — Cheukfan Lee
(74) *Attorney, Agent, or Firm* — Scully, Scott, Murphy & Presser, PC

(57) ABSTRACT

An image scanning device according to aspects of the present disclosures includes a transparent plate member on which an original document can be placed, a line sensor configured to receive a light emitted from a light source and reflected by the original document, and output an electrical signal according to the reflected light, a holding member configured to cover an upper surface of the plate member, and a controller. The controller is configured to obtain a first electrical signal corresponding to a first reflected light when the light source emits light having a first light amount, obtain a second electrical signal corresponding to a second reflected light when the light source emits light having a second light amount, and determine a particular scanning mode for scanning the original document placed on the plate member based on an image difference value calculated from the first and second electrical signals.

8 Claims, 8 Drawing Sheets

IMAGE SCANNING DEVICE

CROSS-REFERENCE TO RELATED APPLICATIONS

This application claims priority under 35 U.S.C. § 119 from Japanese Patent Application No. 2020-057873 filed on Mar. 27, 2020. The entire subject matter of the application is incorporated herein by reference.

BACKGROUND

Technical Field

The present disclosures relate to an image scanning device configured to scan an image on an original document.

Related Art

There has been known an image scanning device which is equipped with a sensor, such as a contact image sensor (CIS), on a backside of a contact glass on which an original document is placed. The sensor is configured to scan an image of the original document placed on the contact glass by receiving light, which is emitted toward the original document by a light source and reflected by the original document.

SUMMARY

Original documents that are placed on the contact glass can vary in thickness. If various original documents are scanned under the same conditions regardless of the thickness of the document, the following problems may occur. For example, if the sensor scans a thin document, the reflected light from the light source may be too large and a density of the image of the scanned original document may become too thin. For this reason, there is suggested a technique according to which the thickness of the original document is determined by an ultrasonic sensor or other means, and then the original document is a scanned under condition corresponding to the thickness of the original document. However, in such a case, extra ultrasonic sensors and other components are required, resulting in increased complexity and cost of the equipment.

In contrast, there is known another type of image scanning device in which a sensor used to scan an image of an original document is also used to scan the thickness of the document.

The above-described image scanning device that uses the sensor to scan an image of an original document also to detect the thickness of the original document is configured to use image data which is generated based on reflected light, which is light reflected by the original document irradiated by a particular amount of light emitted from a light source to estimate the thickness of the original document. In such a conventional image scanning device, in estimating the thickness of the document, the light was irradiated only once.

However, with a single irradiation of the light, the image data obtained to estimate the thickness of the original document may vary depending on the degree of degradation of the light source over time. In addition, if the image scanner is configured to scan the original document using both an ADF (automatic original document feeder) and a FB (flatbed), the scanning position of the original document differs depending on whether the ADF or the FB is used. In such a case, the image data obtained to estimate the thickness of the original document may still vary at each scanning position only in a single light irradiation.

According to aspects of the present disclosure, there is provided an image scanning device, including a transparent plate member on which an original document can be placed, a sensor including a light source and arranged to face a lower surface of the plate member, the light source being configured to emit light toward the plate member from below, the sensor being configured to receive reflected light which is light emitted by the light source and reflected by the original document placed on the plate member, and output an electrical signal according to the reflected light, a holding member configured to cover an upper surface of the plate member from above to hold the original document placed on the plate member, and a controller. The controller is configured to obtain a first electrical signal corresponding to a first reflected light which is the reflected light when the light source is controlled to emit light having a first light amount, obtain a second electrical signal corresponding to a second reflected light which is the reflected light when the light source is controlled to emit light having a second light amount, and determine a particular scanning mode from among multiple scanning modes for scanning the original document placed on the plate member based on a first difference value calculated from the first electrical signal and the second electrical signal, the first difference value corresponding to difference between an amount of the first reflected light and an amount of the second reflected light.

DETAILED DESCRIPTION OF THE EMBODIMENT

Hereinafter, with reference to the drawings, a preferred embodiment according to aspects of the present disclosures will be described. The present embodiment is only one example and may be modified accordingly without departing from aspects of the present disclosures.

Configuration of MFP

Figure 1:
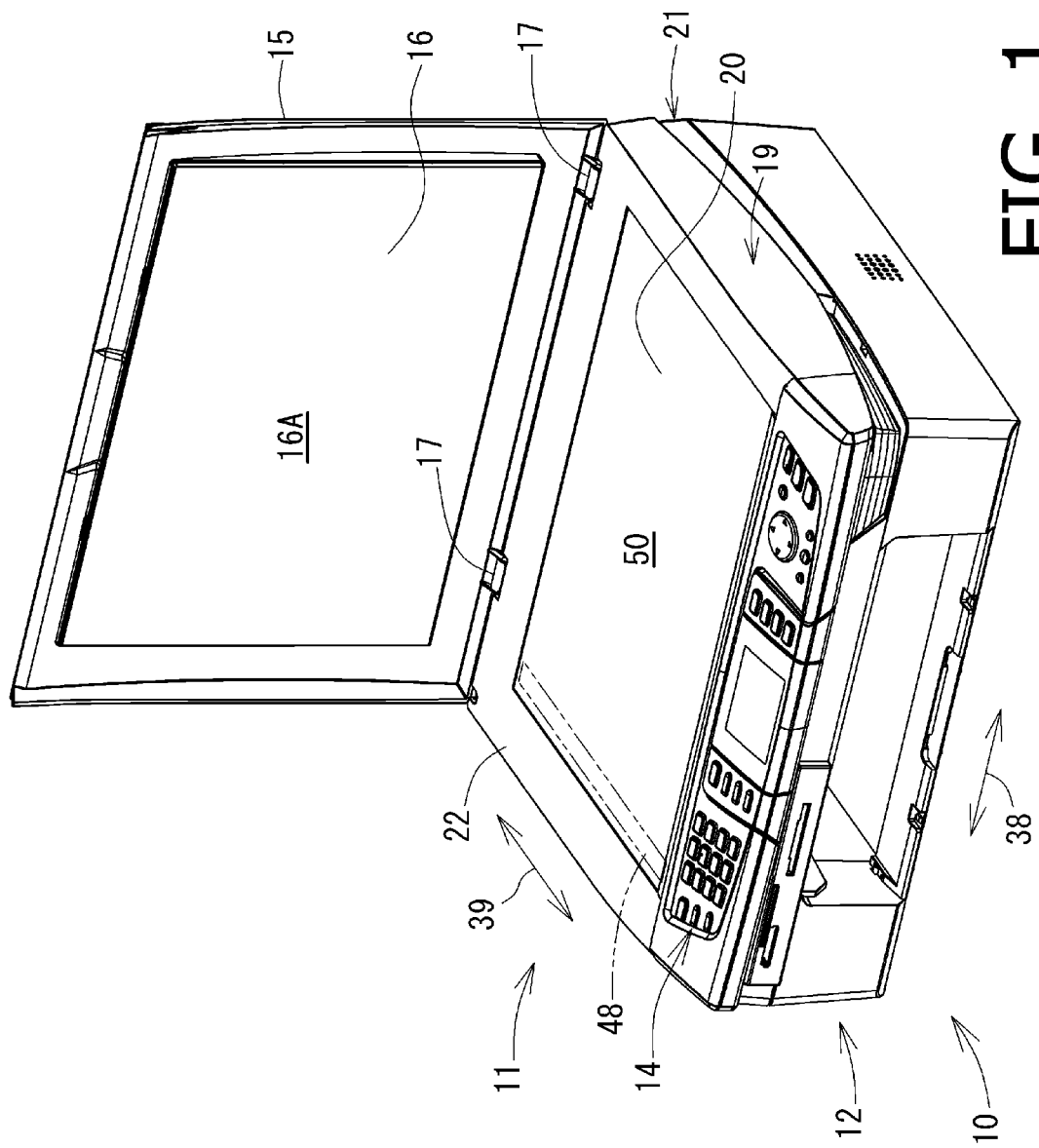
FIG. 1 is a perspective view showing the external configuration of an MFP.

As shown in FIG. 1, an MFP 10 is a multifunctional device integrally equipped with a scanner 11 (an example of an image scanning device) and a printer 12, and has various functions such as a scanning function, a printing function, a copying function, a facsimile function, and the like. It is noted that the present disclosures are applicable not only to the MFP 10 having multiple functions but also to an image scanning device having at least a scanning function.

The MFP 10 has a substantially rectangular outer shape having a width and a depth, each of which is greater than a height. An upper part of the MFP 10 is the scanner 11. The scanner 11 has an original document cover 15, which is openably secured to the original document table 19 via hinges 17 provided on a rear side.

A lower part of the MFP 10 is a printer 12. The printer 12 is configured to record an image on a printing sheet based on image data of an original document scanned by the scanner 11 or print data inputted from an external source. Since the printer 12 is an optional configuration in realizing aspects of the present disclosures, a detailed description of the printer 12 will be omitted.

An operation panel 14 is provided to an upper part of a front side the MFP 10. The operation panel 14 includes a liquid crystal display displaying various information, input keys for a user to enter information, and the like. The scanner 11 and the printer 12 operate based on instruction signals input from the operation panel 14 and instruction signals sent from an external device using a printer driver or a scanner driver.

Configuration of Scanner

As shown in FIG. 1, the original document table 19 has a platen glass 20 (an example of a plate member). The platen glass 20 includes a single transparent glass plate, an acrylic plate, or the like. The original document table 19 has a substantially rectangular parallelepiped housing 21 and an upper surface supporting frame 22. The upper surface supporting frame 22 has an opening formed on its top surface. The platen glass 20 is configured to be larger than the opening formed on the upper surface supporting frame 22. The original document table 19 is configured such that the upper surface supporting frame 22 is fitted, from above, on a housing 21 that supports the platen glass 20 from below. The portion of an upper surface of the platen glass 20 exposed through the opening of the upper surface supporting frame 22 serves as an original document placement area 50. In the original document placement area 50, an original document of an A4-size, a legal-size or smaller may be placed with a surface to be scanned faced downward.

A holding member 16 is provided on a back surface of the original document cover 15 that faces the platen glass 20. The holding member 16 includes a plate-shaped sponge. The holding member 16 is formed to cover the original document placement area 50. When the original document cover 15 is closed, the holding member 16 covers the upper surface of the platen glass 20 and holds the original document placed on the original document placement area 50. In this embodiment, a lower surface 16A, that contacts the original document placed on the platen glass 20, of the holding member 16 is configured to be entirely gray.

Figure 2:
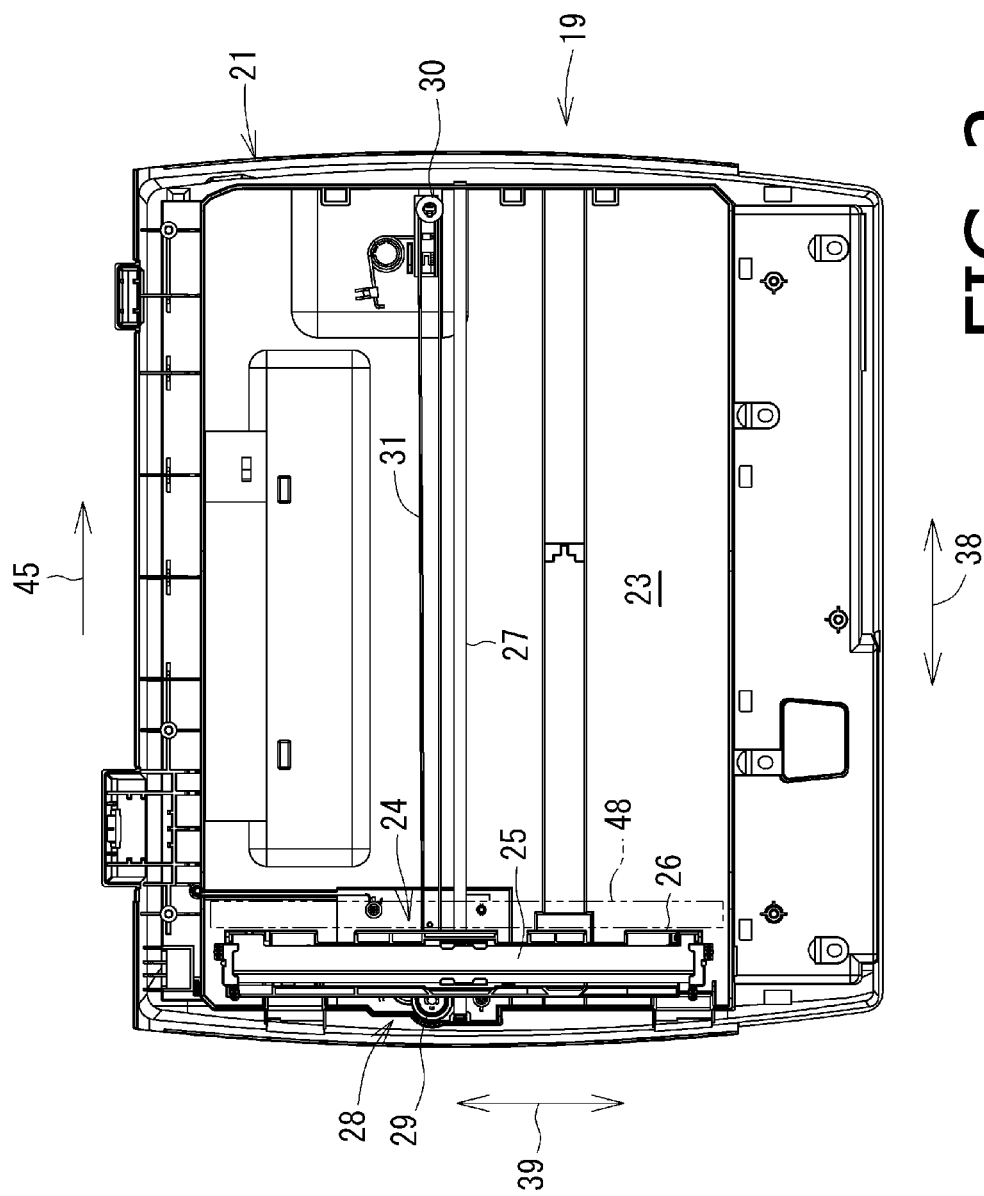
FIG. 2 is a plan view showing an internal configuration of an original document table.

FIG. 2 is a plan view of an internal configuration of the original document table 19. It is noted that FIG. 2 shows a state where the upper surface supporting frame 22 (see FIG. 1) is removed.

As shown in FIG. 2, an image scanning unit 24, a guide shaft 27, and a belt driving mechanism 28 are provided below the lower surface of the platen glass 20 (i.e., the backside of the upper surface), facing the lower surface of the platen glass 20. The image of the original document placed on the original document placement area 50 (see FIG. 1) is scanned by the image scanning unit 24. The image scanning unit 24 is equipped with a carriage 26 and a line sensor 25 (an example of a sensor).

The carriage 26 extends along a main scanning direction 39. The main scanning direction 39 is a direction in which the line sensor 25 is extended. Inside the housing 21, the guide shaft 27 is provided such that the guide shaft 27 extends in a sub scanning direction 38. The sub scanning direction 38 is a direction orthogonal to the main scanning direction 39 and is the direction in which the line sensor 25 is configured to move. The carriage 26 is engaged with the guide shaft 27. The carriage 26 is driven by a belt driving mechanism 28 to move in the sub scanning direction 38 as guided by the guide shaft 27.

The line sensor 25 is mounted on an upper side of the carriage 26. The line sensor 25 is configured to emit light toward the platen glass 20 and receives the reflected light, which is reflected by the original document placed on the platen glass 20. As the line sensor 25, a sensing device with a short focal length, such as a contact image sensor (CIS: Contact Image Sensor), is used.

Since the line sensor 25 is mounted on the carriage 26, the line sensor 25 is configured to move in the sub scanning direction 38 as the carriage 26 moves.

When a scanning operation of the original document is not being performed, the line sensor 25 is located at a home position 48 (see FIGS. 1 and 2). The home position 48 is defined at a left end portion of the original document placement area 50. The home position 48 is the position of the line sensor 25 when a scanning mode determining process (described later) is executed, as well as the position of the line sensor 25 at the start of scanning the original document.

The line sensor 25 faces a lower surface 16A, of which color is gray, of the holding member 16 through the platen glass 20 when the original document is not placed on the platen glass 20, while faces a lower surface (i.e., an image bearing surface) of the original document through the platen glass 20 when the original document is placed on the platen glass 20.

Although not shown, the line sensor 25 has light sources, lenses, and a plurality of light-receiving elements. Chips of the light-receiving elements of the line sensor 25 are arranged on an upper surface side of the carriage 26 along the main scanning direction 39. The line sensor 25 is configured to receive the reflected light from the original document placed on the original document placement area 50 and the reflected light from the gray-colored lower surface 16A of the holding member 16. The light source and lens of the line sensor 25 are arranged to extend in the same direction as a direction where the light-receiving elements are arranged. The line sensor 25 is configured to receive the light which is emitted from the light source toward the platen glass 20 and reflected by the original document or the lower surface 16A of the holding member 16 and converged by the lens, and convert the received light to electrical signals with the light-receiving elements. The electrical signals are output as analog image data to the controller 100 (see FIG. 3) (described later).

The light source is configured to emit light in the three primary colors of R (red), G (green), and B (blue) individually or simultaneously. When the light of the three primary colors is emitted simultaneously, the light source emits white light.

The belt driving mechanism 28 includes a driving belt 31, a driving pulley 29, and a driven pulley 30. A support plate 23 is provided, inside the housing 21, below the platen glass 20. The driving pulley 29 and the driven pulley 30 are provided at both ends of the support plate 23 in the width direction (left-right direction in FIG. 2), respectively. The driving belt 31 is an endless, looped belt with teeth formed on the inside. The driving belt 31 is looped around the driving pulley 29 and the driven pulley 30. A shaft of the driving pulley 29 is extended downward and is connected to a motor 35 (see FIG. 3) located on a back surface side of the support plate 23. A DC motor, for example, is used as the motor. A driving force of the motor is transmitted to the shaft of the driving pulley 29, and the driving pulley 29 rotates, causing the driving belt 31 to move around. According to this configuration, the carriage 26 is caused to reciprocate in the sub scanning direction 38 with facing the platen glass 20. That is, the line sensor 25 is reciprocated in the sub scanning direction 38 by the driving force supplied by the motor. It is noted that the motor 35 is located on the back side of the support plate 23 and is not shown in FIG. 2.

Operations of Controller

Figure 3:
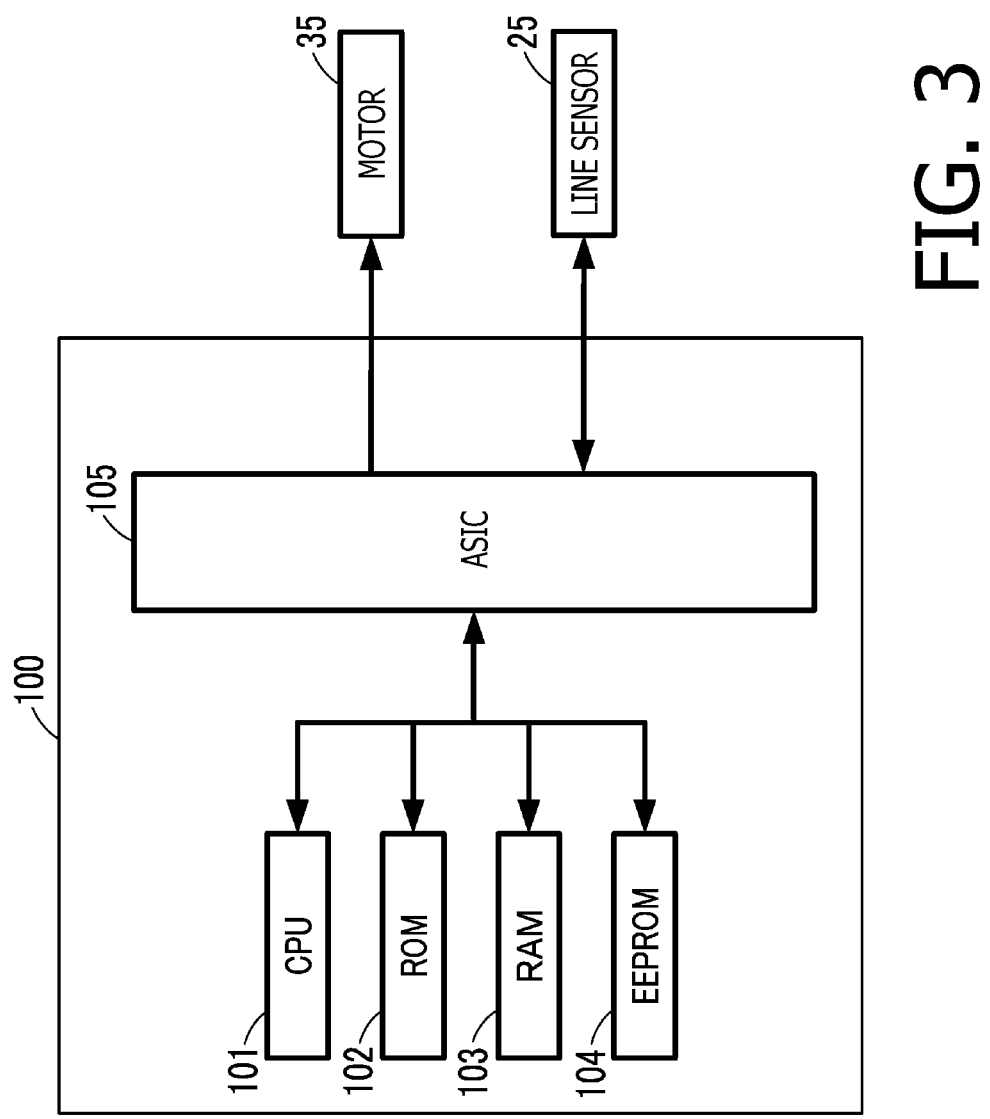
FIG. 3 is a block diagram showing a schematic configuration of a controller of the MFP.

The controller 100 shown in FIG. 3 is configured to control an overall operation of the MFP 10. As shown in FIG. 3, the controller 100 is configured as a microcomputer mainly including a CPU 101, a ROM 102, a RAM 103, an EEPROM 104, and an ASIC 105. The controller 100 is configured to control the image scanning unit 24, the various driving devices of the printer 12, and so forth. A characteristic feature according to aspects of the present disclosures is realized by the controller 100 operating in accordance with a flowchart shown in FIG. 4.

The ROM 102 contains programs and other information for the CPU 101 to control the image scanning unit 24 and the MFP 10. The RAM 103 is used as a storage area for temporarily storing various data used by the CPU 101 in executing the above-mentioned programs or as a work area for data processing and the like. The EEPROM 104 stores settings, flags, etc. that should be retained even after power off.

The ASIC 105 is connected to the motor 35. The ASIC 105 is configured to generate a drive signal to rotate the motor 35 and control the motor 35 based on the generated drive signal. The motor 35 rotates forwardly or reversely depending on the drive signal from the ASIC 105. When the motor 35 rotates forwardly, the carriage 26 moves in a sensing direction 45 (see FIG. 2) along the sub scanning direction 38, and when the motor 35 rotates reversely, the carriage 26 moves in a direction opposite to the sensing direction 45 along the sub scanning direction 38.

The ASIC 105 is connected to the line sensor 25. The ASIC 105 controls the image scanning operation by the line sensor 25, including, for example, adjustment of an operating current to light the light source of the line sensor 25.

When the controller 100 is instructed to start scanning an original document from the operation panel 14 or an external device connected to the MFP 10 through a LAN or other means, the controller 100 controls the driving of the motor 35. This causes the line sensor 25 to move from the home position 48 in the sensing direction 45 (see FIG. 2). During the movement, the line sensor 25 faces the original document placement area 50. In this movement process, the line sensor 25 is controlled by the controller 100 and light is emitted from the light source of the line sensor 25 to the original document placement area 50. Accordingly, an electrical signal is output from each light-receiving element according to an intensity of the reflected light from the original document placed in the original document placement area 50. In other words, analog image data based on the intensity of the reflected light from the original document is output from the line sensor 25 to the ASIC 105 (the analog image data being a collection of electrical signals output from respective light-receiving elements). This image scanning by the line sensor 25 is performed at each line in the process of moving the carriage 26.

The ASIC 105 converts electrical signals (analog image data) received from the line sensor 25 to image data of a particular number of bits of digital code. This digital conversion is performed by an analog-to-digital converter built in the ASIC 105. The digital conversion generates multi-value image data represented in 8 bits (256-step gradation: 0 to 255). That is, in the ASIC 105, the intensity range of light that can be received by the light-receiving elements of the line sensor 25 is divided into 256 division ranges. The intensity of the light is then expressed as a number between 0 and 255, depending on which of the 256 divisional ranges includes the intensity of the light received by each light-receiving element of the line sensor 25. It should be noted that, in this embodiment, a case where the number of division ranges is 256 is described, but the number of division ranges does not need to be limited to this number, but another number, for example, 128 may be set.

In addition to a circuit for controlling the motor 35 described above and a circuit for converting the electrical signals (analog image data) received from the line sensor 25 into the multi-level image data, the ASIC 105 includes a binarization circuit for binarizing the multi-level image data, a shading correction circuit for applying a shading correction to the multi-level image data, a gamma correction circuit for applying a gamma correction to the image data processed by the shading correction circuit, a resolution conversion circuit, a color conversion circuit and the like. Since the above-mentioned circuits are well-known, a detailed description thereof is omitted.

Scanning Mode Determining Process

An example of the scanning mode determining process performed by the controller 100 will be described with referent to the flowchart shown in FIG. 4. The scanning mode determining process is a process of determining a scanning mode to be used to scan the original document placed on the platen glass 20. In other words, the scanning mode determining process is a process of determining a particular scanning mode from among a plurality of scanning modes.

The plurality of scanning modes is stored in the ROM 102 or EEPROM 104 of the controller 100. Each scanning mode includes a plurality of set values. At least one of the plurality of set values for each scanning mode is different from the corresponding set values for the other scanning modes.

According to the present embodiment, each scanning mode includes two types of setting values: a light intensity of the light emitted by the light source when scanning the original document; and a gamma value to be used when adjusting the image of the scanned original document. It is noted that the setting values do not need to be limited to the above two types.

Further, in the present embodiment, two scanning modes (i.e., a first scanning mode and a second scanning mode) are stored in the ROM 102 or EEPROM 104 of the controller 100. In other words, according to the present embodiment, the scanning mode determining process is a process for determining which of the two scanning modes (i.e., the first scanning mode and the second scanning mode) is to be used to scan the original document. It is noted, however, the number of scanning modes does not need to be limited to two.

The first scanning mode is a scanning mode for scanning the original document having a first thickness (typically an original document thinner than a plain sheet (a regular sheet)). The second scanning mode is a scanning mode for scanning the original document having a second thickness (typically an original document thicker than the plain sheet) that is thicker than the first thickness.

In this embodiment, an amount of light for the first scanning mode is set to be smaller than an amount of light for the second scanning mode. That is, the amount of light emitted from the light source when scanning the original document in the first scanning mode is less than the amount of light emitted by the light source when scanning the original document in the second scanning mode.

Figure 5:
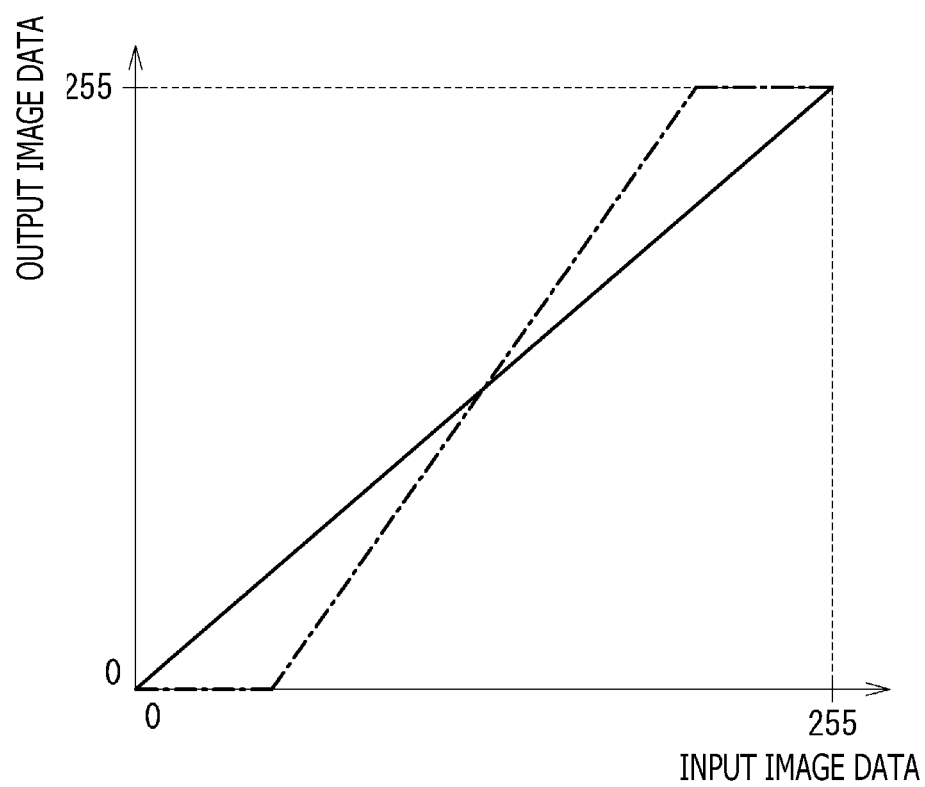
FIG. 5 is a graph showing a relationship between input image data and output image data.

Further, in the present embodiment, the gamma value for the first scanning mode is set to be "1." That is, as shown in FIG. 5, a relationship between values of the input image data (i.e., the multi-level image data before correction) shown on the horizontal axis and values of the output image data (i.e., the multi-level image data after correction) shown on the vertical axis indicated by the solid line are equal. On the other hand, the gamma value of the second scanning mode is set to a value smaller than "1" on the larger side of the input image data (nearer to 255 out of 256 division ranges of 0-255) and to a value greater than "1" on the smaller side of the input image data (nearer to 0 out of 256 division ranges of 0-255).

In other words, as shown by the single-dotted line in FIG. 5, when the input image data is close to "0," the output image data is corrected to be "0" even if it is not "0," and when the input image data is close to "255," the output image data is corrected to be "255" even if it is not "255." That is, in the first scanning mode, the response characteristics of the gradation between the input image data and the output image data are not corrected, but in the second scanning mode, the response characteristics of the grayscale between the input image data and the output image data are corrected so that the response characteristics of the gradation are corrected to be "0" (black) when the input image data is close to "0" (close to black) and corrected to "255" (white) when the input image data is close to "255" (close to white).

Figure 4:
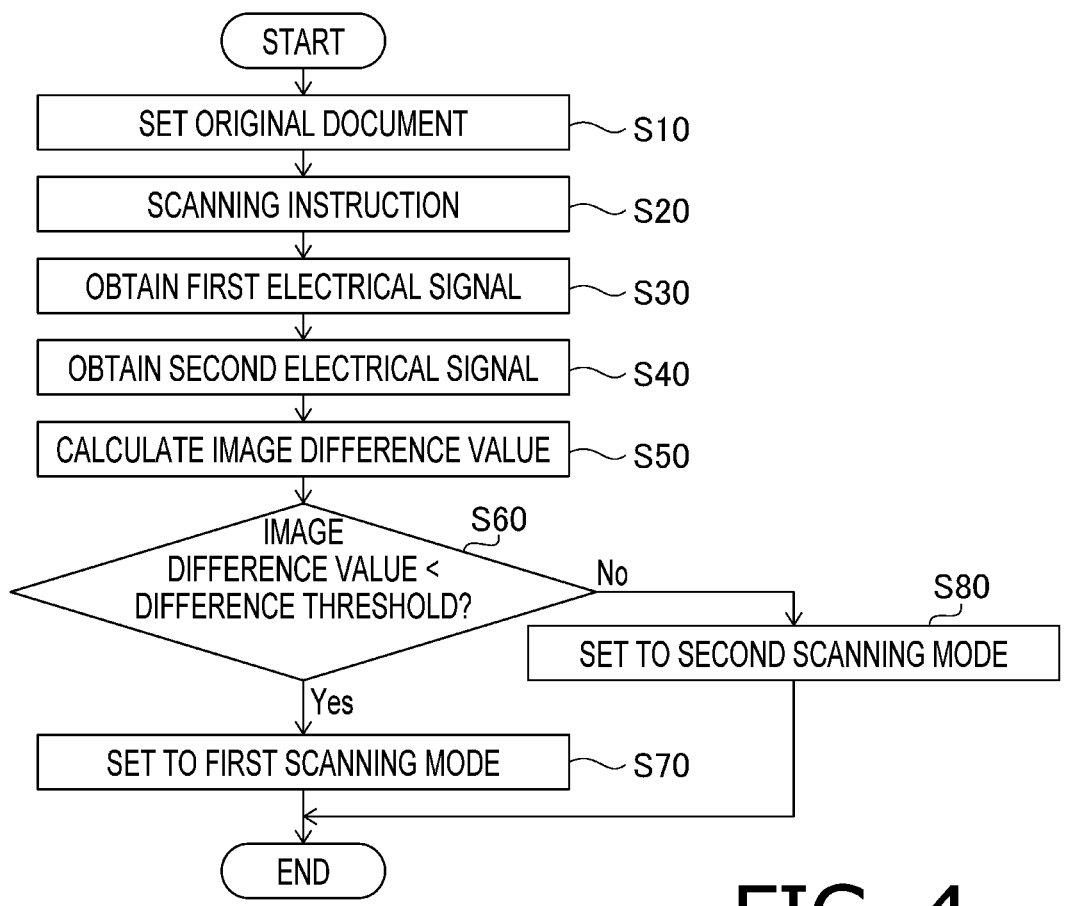
FIG. 4 is a flowchart showing an example of a scanning mode determining process according to the present embodiment.

As shown in FIG. 4, in the scanning mode determining process, the original document is set firstly (S10). In detail, the original document is placed by a user in the original document placement area 50 of the platen glass 20 and the original document cover 15 is closed. At this time, the line sensor 25 is positioned at the home position 48 (see FIGS. 1 and 2) since the original document scanning operation has not yet been performed.

Next, the scanning of the original document is instructed (S20). In detail, the user operates the operation panel 14 to instruct to scan the original document, and an electrical signal indicating to scan the original document is sent from the operation panel 14 to the controller 100. The controller 100, having obtained the electrical signal, executes S30 onwards. It is noted that inputting the instruction to scan the original document does not need to be limited to the operation of the operation panel 14 by the user. The controller 100, which has obtained an electrical signal from a sensor, which is configured to detect the opening and closing of the original document cover 15, to indicate that the original document cover 15 is closed, may execute step S30 onwards.

The controller 100 controls the line sensor 25 to emit the light having the first light amount. In this case, the light source simultaneously emits light in the three primary colors of R, G, and B. The first light amount is a light amount set in advance. A part of the light having the first light amount from the light source is reflected by the original document and converged on the light-receiving elements by the lens. The remainder of the light having the first light amount emitted from the light source passes through the original document and is reflected on the gray-colored lower surface 16A of the holding member 16, passes through the original document again, and is converged on the light-receiving elements by the lens. The light-receiving elements output first electrical signals to the controller 100 in accordance with the amount of the converged light. The controller 100 obtains the first electrical signals (S30). It is noted that since the line sensor 25 is not moving, the first electrical signal is the signal corresponding to one line of the image.

Next, the controller 100 controls the line sensor 25 to cause the light source to emit light having a second amount. In this case, the light source simultaneously emits light of the three primary colors, R, G, and B. The second light amount is a light amount set in advance. A part of the light having the second light amount and emitted by the light source is reflected by the original document, and converged by the lens on the light-receiving elements. The remainder of the light having the second light amount is emitted from the light source passes through the original document, reflected by the gray-colored lower surface 16A of the holding member 16, passes through the original document again, and is converged on the light-receiving elements by the lens. The light-receiving element outputs second electrical signals to the controller 100 in accordance with the amount of the converged light. The controller 100 obtains the second electrical signals (S40). Since the line sensor 25 has not yet moved, the second electrical signals correspond to the signals corresponding to the image of the same line as the first electrical signals represent.

Hereinafter, an example of the amount of light that the light-receiving elements of the of the line sensor 25 collect when original documents 32A and 32B (i.e., a first thickness original document 32A and a second thickness original document 32B) having different thicknesses are placed on the platen glass 20 will be described, with reference to FIG. 6.

In the example described below, the light amount is assumed to be a unitless value for the sake of explanation. In the example described below, it is assumed that the first light amount is 100 and the second light amount is 1000. It is noted that, in this example, the second light amount is greater than the first light amount, but the first light amount may be greater than the second light amount.

In the example described below, it is assumed that the platen glass 20 passes 100% of light (i.e., transparent), the first thickness passes original document 32A 40% of light, and the second thickness original document 32B passes 10% of light. Further, it is assumed that the first thickness passes original document 32A reflects 60% of light, the second thickness original document 32B having the second thickness reflects 90% of light, and the gray-colored lower surface 16A of the holding member 16 reflects 50% of light. Further, in FIG. 6, for convenience of explanation, the line sensor 25, the platen glass 20, the first thickness passes original document 32A, the second thickness original document 32B, and the holding member 16 are shown spaced apart from each other.

Firstly, an exemplary case where the first thickness passes original document 32A is placed on the platen glass 20 will be described.

Figure 6A:
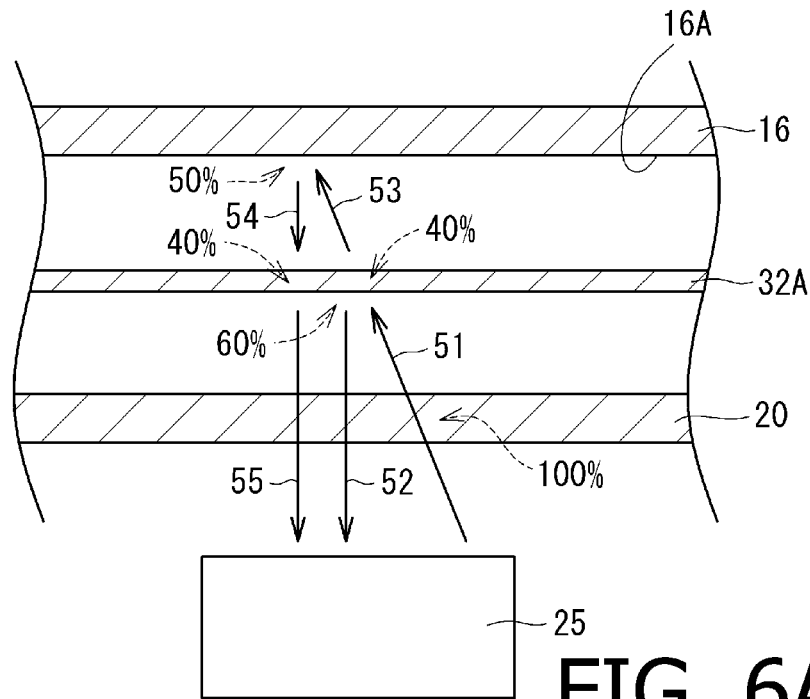
FIGS. 6A and 6B show reflection and transmission, by an original document, of light emitted from the line sensor.

As shown in FIG. 6A, when light 51 having the first light amount (light amount=100) is emitted from the light source of the line sensor 25, 100% of the light emitted by the light source transmits through the platen glass 20, as shown in FIG. 6A. The light 51 transmitted through the platen glass 20 is divided into two parts: the reflected light 52 (light amount=100×60%=60) reflected by the first thickness passes original document 32A and the transmitted light 53 (light amount=100×40%=40) transmitted through the first thickness passes original document 32A. A part of the transmitted light 53 is reflected by the lower surface 16A of the holding member 16 to become the reflected light 54 (light amount=40×50%=20). A part of the reflected light 54 is transmitted through the first thickness passes original document 32A to become transmitted light 55 (light amount=20×40%=8). The reflected light 52 and the transmitted light 55 are converged by the lens on the light-receiving elements of the line sensor 25. That is, the amount of light converged on the light-receiving elements is 60+8=68. The light-receiving elements convert the light amount of 68 into the first electrical signal and output the same to the controller 100.

When the light 51 having the second light amount of light (light amount=1000) is emitted from the light source of the line sensor 25, 100% of the emitted light is transmitted through the platen glass 20. The light 51 transmitted through the platen glass 20 is divided into reflected light 52 (light amount=1000×60%=600) reflected by the first thickness passes original document 32A and transmitted light 53 (light amount=1000×40%=400) transmitted through the first thickness passes original document 32A. A part of the transmitted light 53 is reflected by the lower surface 16A of the holding member 16 to become the reflected light 54 (light amount=400×50%=200). The other part of the reflected light 54 is transmitted through the first thickness passes original document 32A to become transmitted light 55 (light amount=200×40%=80). The reflected light 52 and the transmitted light 55 are converged by the lens on the light-receiving elements of the line sensor 25. In other words, the amount of light converged on the light-receiving elements is 600+80=680. The light-receiving elements convert this light having the light amount of 680 into the second electrical signals and output the same to the controller 100.

Next, an exemplary case where the second thickness original document 32B is placed on the platen glass 20 will be described.

Figure 6B:
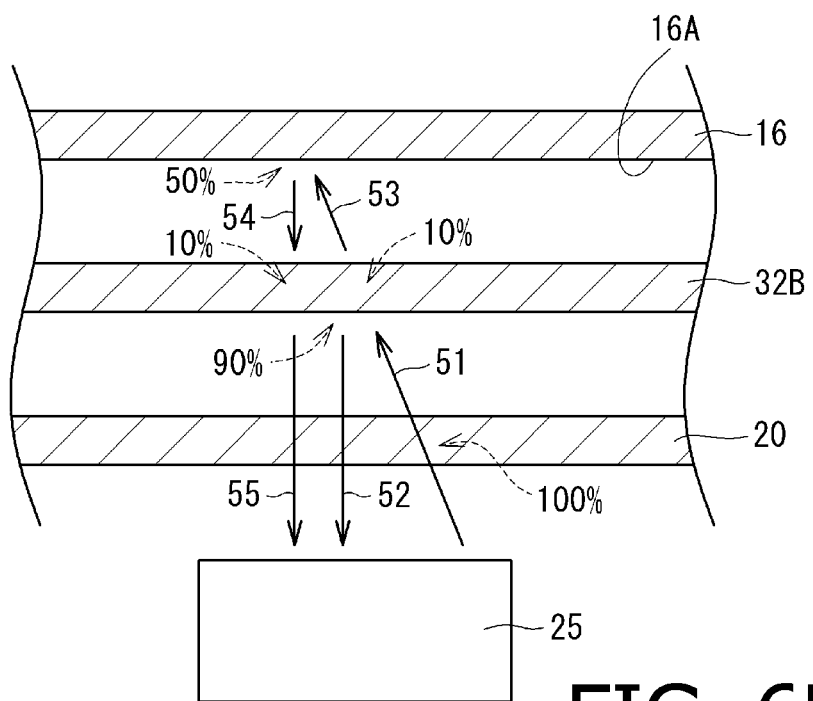

As shown in FIG. 6B, the light 51 having the first light amount (light amount=100) is emitted from the light source of the line sensor 25, and 100% of the light 51 transmits through the platen glass 20. The light 51 transmitted through the platen glass 20 is divided into two parts: the reflected light 52 (light amount=100×90%=90) reflected by the second thickness original document 32B; and the transmitted light 53 (light amount=100×10%=10) transmitted through the second thickness original document 32B. A part of the transmitted light 53 is reflected by the lower surface 16A of the holding member 16 to become reflected light 54 (light amount=10×50%=5). The other part of the reflected light 54 is transmitted through the second thickness original document 32B to become transmitted light 55 (light amount=5× 10%=0.5). The reflected light 52 and the transmitted light 55 are converged by the lens on the light-receiving elements of the line sensor 25. In other words, the light amount of the light converged on the light-receiving elements is 90+0.5=90.5. The light-receiving elements convert this light amount of 90.5 into a first electrical signal and output it to the controller 100.

The light 51 having the second light amount (light quantity=1000) is emitted from the light source of the line sensor 25, and 100% of the light 51 is transmitted through the platen glass 20. The light 51 transmitted through the platen glass 20 is divided into the reflected light 52 (light amount=1000×90%=900) reflected in the second thickness original document 32B, and the transmitted light 53 (light amount=1000×10%=100) transmitted through the second thickness original document 32B. A part of the transmitted light 53 is reflected by the lower surface 16A of the holding member 16 to become the reflected light 54 (light amount=100×50%=50). The other component of the reflected light 54 is transmitted through the second thickness original document 32B to become the transmitted light 55 (light amount=50×10%=5). The reflected light 52 and the transmitted light 55 are converged by the lens on the light-receiving elements of the line sensor 25. In other words, the light amount of the light converged on the light-receiving elements is 900+5=905. The light-receiving elements convert this light amount 905 into second electrical signals and output the same to the controller 100.

Next to S40, the controller 100 calculates an image difference value (an example of a first difference value) from the first and second electrical signals (S50). That is, the controller 100 converts the first electrical signal obtained from the line sensor 25 in S30 into 8-bit multi-level pixel data. Thus, multi-valued pixel data is generated for each of a plurality of pixels constituting a line. The controller 100 extracts pixel data for 16 pixels with large values from the generated plurality of multi-valued pixel data and calculates the average value of these 16 pieces of pixel data respectively corresponding to the 16 pixels. For the second electrical signal, the average value of the 16 pieces of pixel data respectively corresponding to 16 pixels is calculated in the same way as for the first electrical signals. Then, from the average value of the 16 pieces of pixel data calculated based on the second electrical signal, the average value of the 16 pieces of pixel data calculated based on the first electrical signal is subtracted. The value calculated by the subtraction indicates the image difference value.

It is noted that the calculation method of calculating the image difference value does not need to be limited to the method described above. For example, the number of pixels to be extracted from a plurality of pixels constituting one line may be other than 16 pixels (e.g., 32 pixels or all pixels of the line). Alternatively, for example, the pixels to be extracted from the plurality of pixels constituting one line may be randomly selected.

Next, the controller 100 compares the image difference value with a difference threshold value (S60). The difference threshold value is a value defined in advance and is stored in the ROM 102 or the EEPROM 104. The difference threshold is set based on experiments of emitting various amounts of light from the line sensor 25 to various thicknesses and types of original documents placed on the platen glass 20, and measuring the reflected light with respect to the incident light.

When the image difference value is less than (or equal to or less than) the difference threshold value (S60: YES), the controller 100 determines that the original document placed on the platen glass 20 is a thin original document (i.e., the original document having the first thickness). In this case, the controller 100 sets the scanning mode for scanning the original document placed on the platen glass 20 to the first scanning mode (S70).

On the other hand, if the image difference value is equal to or greater than (or greater than) the difference threshold value (S60: NO), the controller 100 determines that the original document placed on the platen glass 20 is a thick original document (i.e., the original document having the second thickness). In this case, the controller 100 sets the scanning mode for scanning the original document placed on the platen glass 20 to the second scanning mode (S80).

As described above referring to FIG. 6, when the first thickness original document 32A is placed on the platen glass 20, the amount of light corresponding to the first electrical signal is 68 and the amount of light corresponding to the second electrical signal is 680. When the second thickness original document 32B is placed on the platen glass 20, the amount of light corresponding to the first electrical signal is 90.5 and the amount of light corresponding to the second electrical signal is 905. Thus, the difference between the first and second electrical signals is greater when the thicker original document 32B is placed on the platen glass 20 than when the thinner original document 32A is placed on the platen glass 20. This is also true for the pixel data obtained by converting these electrical signals. As a result, the image difference value obtained when the thicker original document 32B is placed on the platen glass 20 is equal to or greater than the image difference value obtained when the thinner original document 32A is placed on the platen glass 20. Therefore, if the difference threshold value is set to a value between the above-described two obtained image difference values, the controller 100 can determine in S60 whether the original document placed on the platen glass 20 is the thin original document (i.e., the first thickness original document 32A) or the thick original document (i.e., the second thickness original document 32B).

As described above, the controller 100 is configured to determine a particular scanning mode from among a plurality of scanning modes when scanning an original document placed on the platen glass 20, based on the image difference value.

It is noted that, after determining the scanning mode to be used, the line sensor 25 is moved from the home position 48 in the sensing direction 45 and the image of the original document is scanned in the determined scanning mode.

Effects

According to the present embodiment, a thickness of the original document is estimated based on the image differential value calculated from the first electrical signal according to the reflected light corresponding to the light having the first light amount and the second electrical signal according to the reflected light corresponding to the second light amount. Then, the scanning mode for scanning the original document is set to a particular scanning mode based on the estimated thickness. In other words, according to the present embodiment, the image difference value according to the difference in a light amount of the two light is used to determine the scanning mode, not a value according to the light amount of single light. Therefore, even if there are variations in reflected light or electrical signals due to degradation of the light source or differences in the scanning position of the document, such variations are canceled out when calculating the image difference value. As a result, the variation in the scanned image data caused by the degradation of the light source and/or differences in the scanning position of the original document can be reduced.

According to the present embodiment, the scanning mode can be determined by simply comparing the electrical signal with the difference threshold value.

According to the present embodiment, by reducing the amount of light emitted by the light source in the scanning mode for scanning the thin original document that may allow the light to pass therethrough, the thin original document can be scanned properly.

The thin original document allows the light to pass therethrough easily. Therefore, when the thin original document is scanned, the so-called "whiteout," which is a phenomenon that the image of the scanned original document turns white, may occur. According to the present embodiment, the occurrence of whiteout can be reduced by setting the gamma value for correcting an image scanned from the thin original document to a different value from the gamma value for correcting an image scanned from the thick document.

When the lower surface 16A of the holding member 16 is white, the light amount of the reflected light, which is emitted by the light source and reflected on the lower surface 16A of the holding member 16, becomes too large, and there is a high possibility that the image of the scanned original document will become white (i.e., so-called the whiteout) will occur. According to the present embodiment, since the lower surface 16A of the holding member 16 is gray, the amount of light of the reflected light is smaller than in the case where the lower surface 16A of the holding member 16 is white, and thus the occurrence of the whiteout can be suppressed.

Modifications

Figure 7:
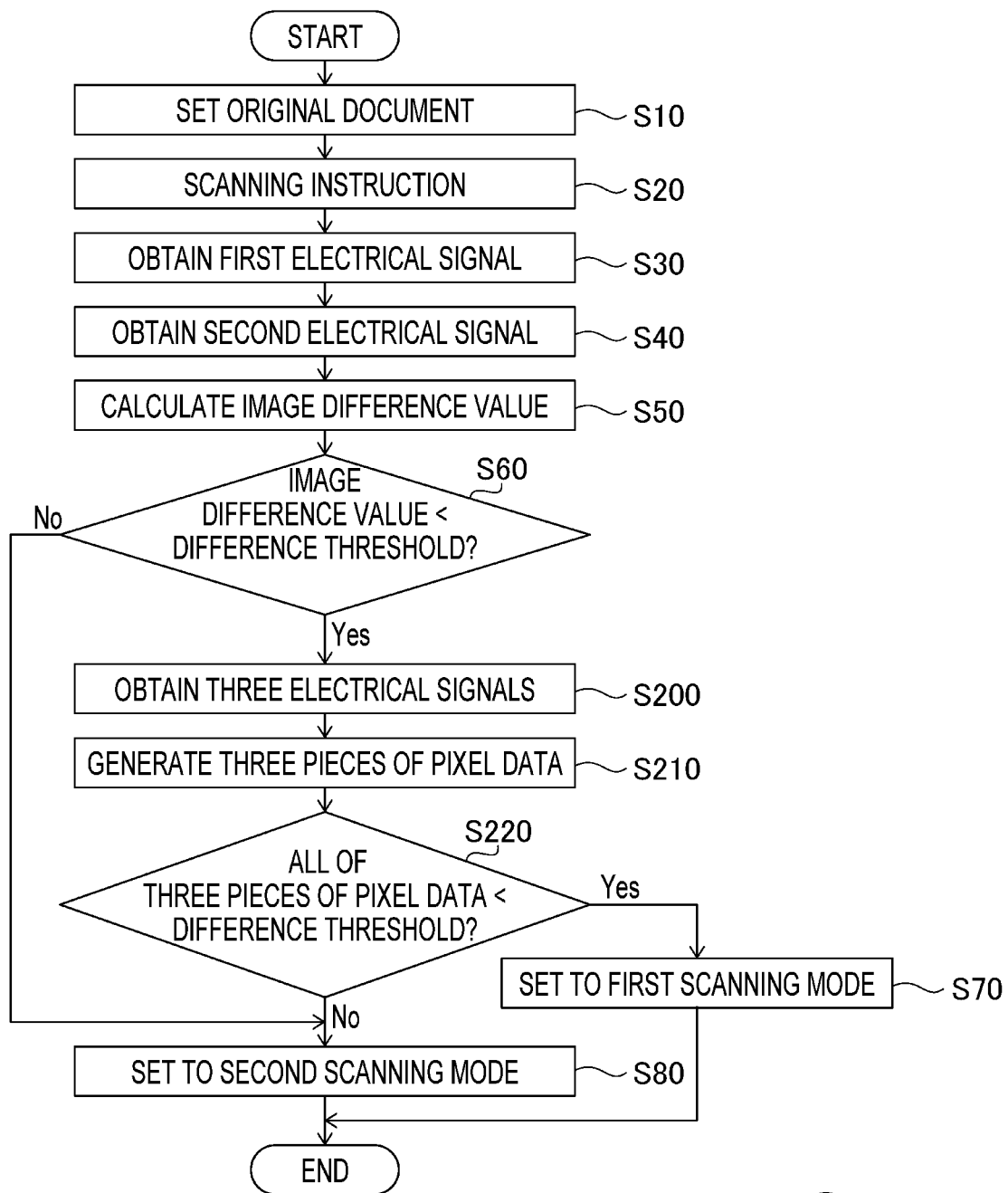
FIG. 7 is a flowchart showing an example of a scanning mode determining process according to a modification.

In the above embodiment, when the image difference value is less than the difference threshold value (S60: YES), the controller 100 determines that the original document placed on the platen glass 20 is the thin original document (i.e., the first thickness original document) (S70). The above configuration may be modified such that, when the image difference value is less than the difference threshold value (S60: YES), the controller 100 may perform the process from step 200 onward, as shown in FIG. 7.

When the image difference value is less than the difference threshold value (S60: YES), the controller 100 controls the line sensor 25 to emit light, of which amount is set in advance. In this case, the light source emits the light of the three primary colors, R, G, and B, separately. It is noted that the order in which the three primary colors are emitted is arbitrary. According to the above configuration, as in S30 and S40, each of the light-receiving elements outputs three electrical signals corresponding to the amount of light of each of the three primary colors to the controller 100. Thus, the controller 100 obtains the three electrical signals (S200).

Next, the controller 100 converts each of the three electrical signals into pixel data in the same manner as in S50. Thus, three pieces of pixel data, that is, pixel data corresponding to R (red), pixel data corresponding to G (green), and pixel data corresponding to B (blue) are generated (S210).

Next, the controller 100 compares each of the three pieces of pixel data with a color threshold value (S220). The color threshold value is a value set in advance and is stored in the ROM 102 or the EEPROM 104.

When the color of the original document placed on the platen glass 20 is white, in S200, for all three primary colors of light, the light amount of the converged light is greatly reduced in comparison with the light amount of the emitted light. On the other hand, when the color of the original document placed on the platen glass 20 is chromatic, in S200, for one or two of the three primary colors of light, the light amount of the converged light is greatly reduced than the light amount of the emitted light, but the light amount of the rest color of the light is not greatly reduced. For example, when the color of the original document placed on the platen glass 20 is cyan, the amount of the converged light is greatly reduced in comparison with the amount of the emitted light of R (red), which is the complementary color of cyan, but the amount of converged light is not greatly reduced in comparison with the emitted light of G (green) and B (blue).

Therefore, when all three pieces of pixel data are less than (or equal to or less than) the color threshold (S220: YES), the controller 100 determines that the original document placed on the platen glass 20 is a white, thin original document (i.e., the first thickness original document). In this case, the controller 100 sets the scanning mode for scanning the original document placed on the platen glass 20 to the first scanning mode (S70).

On the other hand, when at least one of the three pieces of pixel data is equal to or greater than (or greater than) the color threshold value (S220: NO), the controller 100 determines that the original document placed on the platen glass 20 is a colored original document. In this case, the controller 100 sets the scanning mode for scanning the original document placed on the platen glass 20 to the second scanning mode (S80).

By executing the processes after S200, it can be determined whether or not a position, on the original document, to which the light is emitted is chromatic. Then, by performing both the determination based on the image difference value and the determination based on the color threshold value, it becomes possible to prevent the thick original document of which base color is chromatic from being mistakenly determined to be the thin original document.

In the above-described embodiment, the controller 100 compares the image difference value with the difference threshold value (S60) and determines a particular scanning mode from a plurality of scanning modes for scanning the original document placed on the platen glass 20 (S70, S80) based on the result of the comparison. However, the controller 100 needs only to determine the particular scanning mode based on the image difference value, and the particular scanning mode may be determined by means other than comparison with the difference threshold value.

For example, the controller 100 may determine a particular scanning mode based on the ratio of the light amount difference value of the first and second light amounts to the image difference value. In this case, instead of the difference threshold value, a particular threshold ratio is stored in the ROM 102 or the EEPROM 104. In addition to the image difference value, the controller 100 calculates the light amount difference value by subtracting the first light amount from the second light amount in step S50. Then, by dividing the image difference value by the light amount difference value, the ratio of the light amount difference value to the image difference value is calculated.

The controller 100 compares the calculated ratio with the threshold ratio. When the ratio is less than (or equal to or less than) the threshold ratio, the controller 100 determines that the original document placed on the platen glass 20 is the thin original document (i.e., the original document having the first thickness) and sets the scanning mode for scanning the original document placed on the platen glass 20 to the first scanning mode. On the other hand, if the ratio is equal to or greater than (or greater than) the threshold ratio, the controller 100 determines that the original document placed on the platen glass 20 is the thick original document (i.e., the original document having the second thickness original document) and sets the scanning mode for scanning the original document placed on the platen glass 20 to the second scanning mode.

In the above embodiment, the lower surface 16A of the holding member 16 is gray-colored, but the lower surface 16A is not necessarily be gray-colored. For example, the color of the lower surface 16A may be black, or it may be a chromatic color, such as red or blue.

It is noted that, when the lower surface 16A of the holding member 16 is white, the amount of light emitted from the light source and then reflected by the lower surface 16A of the holding member 16 is too large, and there is a high possibility that the image of the scanned original document will turn white, that is, a so-called "whiteout" may occur. In contrast, when the lower surface 16A of the holding member 16 is colored to black or chromatic color, the amount of reflected light is smaller than when the lower surface 16A of the holding member 16 is white, thus suppressing the occurrence of the above-mentioned whiteout.

In the above embodiment, the entire surface of the lower surface 16A of the holding member 16 is colored to gray, but only a part of the lower surface 16A may be colored to gray, black or chromatic color. In this case, the color of the rest of the lower surface 16A has a different color (e.g., white). In this case, when the controller 100 obtains the first and second electrical signals in the scanning mode determining process, the line sensor 25 is configured to be in a position facing the gray or black or chromatic color portion of the lower surface 16A. That is, the lower surface 16A should be colored such that the line sensor 25 located at the home position faces the gray, black or chromatic color portion on the lower surface 16A.

Figure 8:
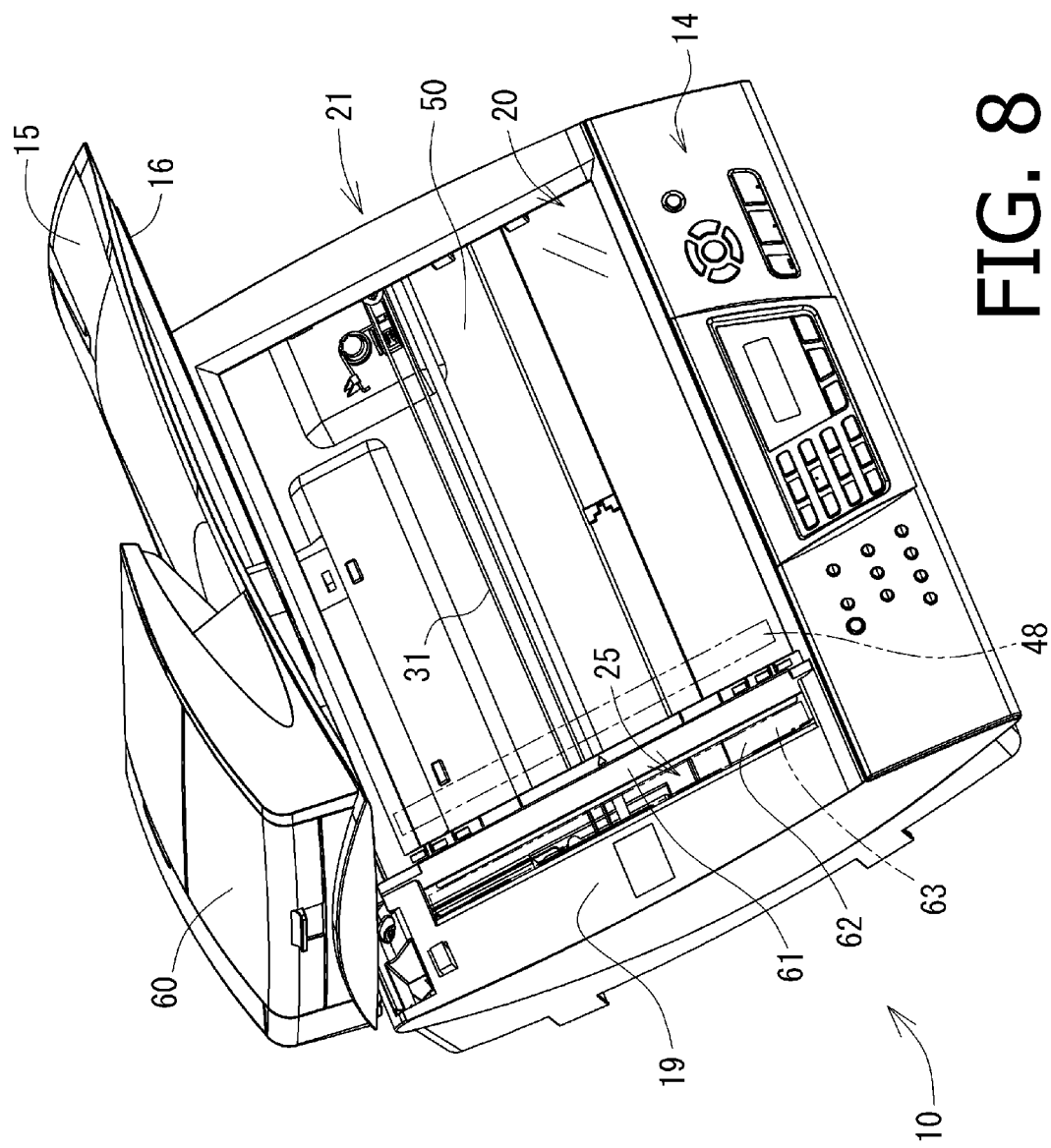
FIG. 8 is a perspective view showing an external configuration of an MFP provided with an ADF.

The MFP 10 may be equipped with an ADF (automatic document feeder) 60, as shown in FIG. 8. In this case, the upper surface of the platen glass 20 is divided by a partition member 61 into an original document placement area 50 and a fed original document scanning area 62. When determining the scanning mode of the original document placed on the original document placement area 50, the line sensor 25 is located at home position 48 at the left end of the original document placement area 50. On the other hand, when determining the scanning mode of the original document sent from ADF 60, the line sensor 25 is located at a second home position 63, which is directly below the fed original document scanning area 62. Then, when a particular portion of the original document fed from ADF 60 (e.g., the tip of the document) passes directly above the fed original document scanning area 62, the process from step S30 onward in the scanning mode determining process is performed.

What is claimed is:

1. An image scanning device, comprising:
   a transparent plate member on which an original document can be placed;
   a sensor including a light source and arranged to face a lower surface of the plate member, the light source being configured to emit light toward the plate member from below, the sensor being configured to receive reflected light which is light emitted by the light source and reflected by the original document placed on the plate member, and output an electrical signal according to the reflected light;
   a holding member configured to cover an upper surface of the plate member from above to hold the original document placed on the plate member; and
   a controller,
   wherein the controller is configured to:
      obtain a first electrical signal corresponding to a first reflected light which is the reflected light when the light source is controlled to emit light having a first light amount;
      obtain a second electrical signal corresponding to a second reflected light which is the reflected light when the light source is controlled to emit light having a second light amount; and
      determine a particular scanning mode from among multiple scanning modes for scanning the original document placed on the plate member based on a first difference value calculated from the first electrical signal and the second electrical signal, the first difference value corresponding to difference between an amount of the first reflected light and an amount of the second reflected light.

2. The image scanning device according to claim 1, wherein the controller is configured to determine the particular scanning mode to:
a first scanning mode to scan the original document having a first thickness on condition that the first difference value is less than a difference threshold value that is set in advance; and
a second scanning mode to scan the original document having a second thickness which is thicker than the first thickness on condition that the first difference value is equal to or greater than the difference threshold value.

3. The image scanning device according to claim 1, wherein the controller is configured to determine the particular scanning mode based on a ratio of a light amount difference value between the first light amount and the second light amount to the first difference value.

4. The image scanning device according to claim 1, wherein, among the multiple scanning modes, light amounts, which are emitted from the light source when the original document is scanned, are different from each other.

5. The image scanning device according to claim 1, wherein, among the multiple scanning modes, gamma values used to adjust an image of a scanned original document are different from each other.

6. The image scanning device according to claim 1, wherein at least a part of a lower surface of the holding member is one of gray and black, and
wherein the sensor is configured to be located at a position to face the at least the part of the lower surface of the holding member when the controller obtains the first electrical signal and the second electrical signal.

7. The image scanning device according to claim 1, wherein at least a part of a lower surface of the holding member has a chromatic color, and
wherein the sensor is configured to be located at a position to face the at least the part of the lower surface of the holding member when the controller obtains the first electrical signal and the second electrical signal.

8. The image scanning device according to claim 1, wherein the light source is configured to emit light having each of three primary colors,
wherein the controller is configured to:
obtain three electrical signals corresponding to each of three reflected lights when the light source is caused to emit light having each of three primary colors;
compare each of values corresponding to the three reflected lights, respectively, with a particular color threshold value based on each of the three electrical signals;
set the particular scanning mode to:
a first scanning mode on condition that each of the values corresponding to the three reflected lights has a value less than the particular color threshold value; and
a second scanning mode on condition that at least one of values corresponding to the three reflected lights has a value equal to or greater than the particular color threshold value.

\* \* \* \* \*